United States Patent
Lynch

(10) Patent No.: US 10,325,413 B2
(45) Date of Patent: Jun. 18, 2019

(54) GENERATING SMOOTH OPTIMIZED PARTS

(71) Applicant: United Technologies Corporation, Farmington, CT (US)

(72) Inventor: Matthew E. Lynch, Canton, CT (US)

(73) Assignee: United Technologies Corporation, Farmington, CT (US)

( * ) Notice: Subject to any disclaimer, the term of this patent is extended or adjusted under 35 U.S.C. 154(b) by 89 days.

(21) Appl. No.: 15/444,701

(22) Filed: Feb. 28, 2017

(65) Prior Publication Data

US 2018/0247462 A1 Aug. 30, 2018

(51) Int. Cl.

| | | |
|---|---|---|
| G06T 15/08 | (2011.01) | |
| G06F 17/50 | (2006.01) | |
| G06T 5/00 | (2006.01) | |
| G06T 19/20 | (2011.01) | |
| G06T 5/30 | (2006.01) | |

(52) U.S. Cl.
CPC .......... *G06T 19/20* (2013.01); *G06F 17/5009* (2013.01); *G06F 17/5018* (2013.01); *G06F 17/5086* (2013.01); *G06T 5/002* (2013.01); *G06T 15/08* (2013.01); *G06F 2217/08* (2013.01); *G06F 2217/12* (2013.01); *G06F 2217/16* (2013.01); *G06T 5/30* (2013.01); *G06T 2200/04* (2013.01); *G06T 2207/20024* (2013.01); *G06T 2207/20032* (2013.01); *Y02P 90/265* (2015.11)

(58) Field of Classification Search
None
See application file for complete search history.

(56) References Cited

U.S. PATENT DOCUMENTS

| | | | |
|---|---|---|---|
| 6,611,617 B1 * | 8/2003 | Crampton | .......... G01B 11/2518 356/614 |
| 2004/0249809 A1 * | 12/2004 | Ramani | ............. G06F 17/30259 |
| 2007/0036437 A1 * | 2/2007 | Razdan | ................ G06K 9/4604 382/186 |
| 2012/0271418 A1 * | 10/2012 | Hollister | ................... A61F 2/28 623/17.11 |
| 2012/0320055 A1 * | 12/2012 | Pekar | .................... G06T 7/0012 345/424 |
| 2014/0277669 A1 | 9/2014 | Nardi et al. | |
| 2015/0190971 A1 | 7/2015 | Musuvathy et al. | |
| 2015/0239178 A1 | 8/2015 | Armstrong | |
| 2015/0360288 A1 | 12/2015 | Zalewski | |
| 2016/0107393 A1 | 4/2016 | Hartmann et al. | |

(Continued)

OTHER PUBLICATIONS

Extended European Search Report for EP Application No. 18157953.3 dated Jul. 20, 2018, 10 pages.

(Continued)

Primary Examiner — Andrew G Yang
(74) Attorney, Agent, or Firm — Kinney & Lange, P.A.

(57) ABSTRACT

A method of generating a smooth optimized part design for a workpiece is presented. Topology optimization is performed based on design objectives, to generate surface data describing an optimized but unfinished surface of the workpiece. The surface data is used to generate volumetric data describing the workpiece structure. A three dimensional smoothing filter is applied to the volumetric data. A manufacturing design is generated from the resulting smoothed volumetric data.

16 Claims, 3 Drawing Sheets

(56) References Cited

U.S. PATENT DOCUMENTS

| | | | | |
|---|---|---|---|---|
| 2016/0140269 A1* | 5/2016 | Wang | ................... | G06F 17/5018 |
| | | | | 703/1 |
| 2016/0143573 A1* | 5/2016 | Brickman | ................. | G06T 7/11 |
| | | | | 382/131 |
| 2016/0283792 A1* | 9/2016 | Okazaki | ............. | G06K 9/00664 |
| 2017/0032547 A1* | 2/2017 | Dennerlein | ............. | G06T 5/002 |
| 2017/0344667 A1* | 11/2017 | Zhou | ....................... | G06T 19/20 |

OTHER PUBLICATIONS

Poh-Soong Tang, et al., "Integration of topology and shape optimization for design of structural components", from Struct Multidisc Optim 22, (2001) pp. 65-82.

Dirk Roos, et al., "Structural Optimization of Solid Components with Topology Optimizing Structural Language", from 19th CAD-FEM Users' Meeting, Oct. 17-19, 2001, pp. 1-11.

A. R. Yildiz, et al., "Integrated optimal topology design and shape optimization using neural networks", from Struct Multidisc Optim 25, (2003) pp. 251-260.

Jean-Christophe Cuilliere, et al., "Towards the Integration of Topology Optimization into the CAD Process", from Computer-Aided Design & Applications, 11(2), (2013) pp. 120-140.

\* cited by examiner

GENERATING SMOOTH OPTIMIZED PARTS

BACKGROUND

Additive manufacturing (AM) is increasingly used to manufacture workpieces for many applications. AM is particularly useful in aerospace production, as it enables designs with complex geometries but without additional cost. Workpieces designed to be additively manufactured can be optimized to enhance performance by departing from the simple geometric designs that can economically be produced through conventional manufacturing techniques (e.g., casting and subtractive machining). One class of optimization methods is topology optimization (TO). TO allows a workpiece shape to be iteratively optimized via finite element analysis using specified (i.e. desired) optimization objectives and boundary conditions. TO can, for example, be used to generate workpiece design shapes for optimal fluid flow, structural stiffness, load capacity, and other design goals.

TO processes typically produce output surface designs in the form of stereolithography (STL) files that commonly exhibit undesirable artifacts. In particular, STL outputs from TO processes are rarely smooth, and sometimes include unwanted voids or tabs of additional material. Before the STL output of a TO process is usable, it must ordinarily be edited or entirely recreated to remove these artifacts. This clean-up process is conventionally a manual and lengthy one.

SUMMARY

A method of generating a smooth optimized part design for a workpiece is presented. Topology optimization is performed based on design objectives, to generate surface data describing an optimized but unfinished surface of the workpiece. The surface data is used to generate volumetric data describing the workpiece structure. A three dimensional smoothing filter is applied to the volumetric data. A manufacturing design is generated from the resulting smoothed volumetric data.

Figure 1:
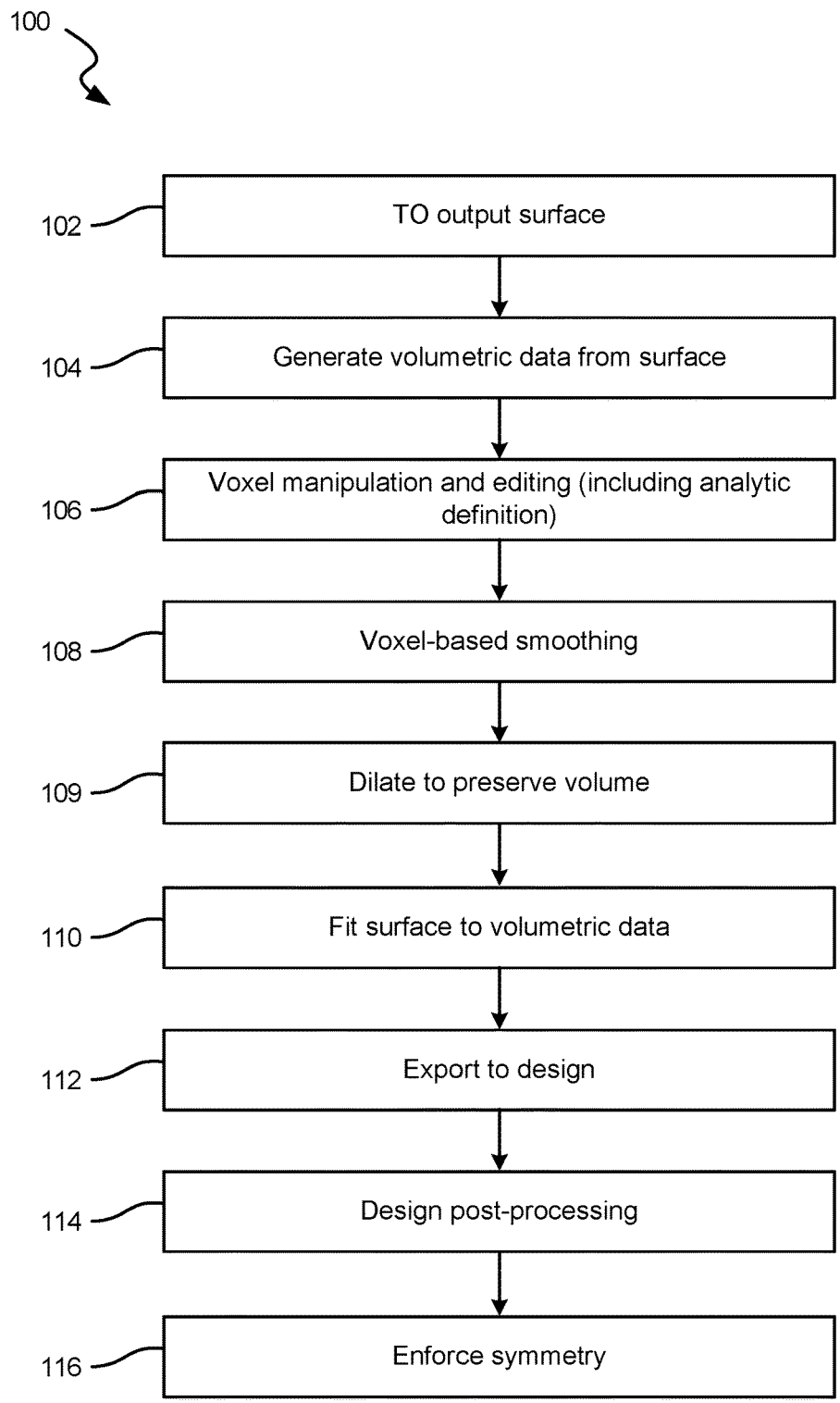
FIG. 1 is a flowchart illustrating a method of generating smooth optimized part designs.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present disclosure concerns methods of artifact removal from workpiece designs generated via topology optimization (TO). In particular, the following methods remove artifacts from TO output surfaces by converting those surfaces into voxel data describing the surfaced workpiece volumetrically, applying smoothing filters to that voxel data, and fitting a surface to the resulting volumetric design. This process smoothes the TO output design, and allows other artifacts to be removed (manually or automatically) with greater ease.

FIG. 1 is a flowchart of method 100, a design method for generating smooth optimized part designs for a workpiece. First, an output surface is generated via TO. (Step 102). Generally, any TO-optimized workpiece surface can be used. TO can be used to optimize for any applicable design objective, including objectives of the workpiece itself (e.g., structural strength, rigidity, mass) and objectives determined or affected by the workpiece, but external to it (e.g., pressure loss or temperature change through a flow passage). This TO-generated output surface is described via a data set such as a stereolithographic (STL) surface contour. This surface data describes an optimized but unfinished surface.

Surface data $S_{TO}$ generated via TO is used to generate volumetric data $V_U$ describing the (still unfinished) workpiece design. (Step 104). This data can, for example, consist of a voxel-based volumetric data set wherein each voxel is assigned a density from 0 to 1, with 0 corresponding to empty space and 1 to solid workpiece. More generally, and more usefully in complex cases, the voxel-based volumetric data set can assign each voxel to a particular phase, e.g., to a particular part, or to the environment. In at least some embodiments the generation of volumetric data begins with distinguishing interior from exterior volume of the workpiece using the unfinished surface as a delineating tool. For a monolithic workpiece, voxels within the interior of the workpiece are assigned to the workpiece, while voxels exterior to the workpiece are assigned to the environment. In some embodiments of the present invention, for example, voxels along a boundary defined by the unfinished surface can, for example, be given fractional assignments (e.g., 60% environment, 40% workpiece) although this is not required. More generally, the above process can be used not only to distinguish between workpiece and non-workpiece material, but to distinguish between multiple workpiece parts designed together to operate as a part of the same structure. The resulting unfinished volumetric data set $V_U$ can, for example, include a voxelized three-dimensional (3D) map of multiple interrelated parts. In an illustrative example having three distinct parts, each voxel has four assignment weightings: one environmental, and one for each of the three parts. These four assignments sum to 1.

The volumetric extrapolation of the TO output surface generated in step 104 can exhibit undesirable artifacts, including unwanted roughness or irregularity, voids, and extraneous material. At least some of these artifacts can, in some embodiments, be removed by editing unfinished volumetric data $V_U$ directly. (Step 106). This editing can include manual addition or subtraction of material (i.e. changing voxel assignment to part or environment, respectively) to remove voids or cavities (whether fully enclosed or exposed to the environment), or extraneous material, or to thicken or thin portions for structural purposes. In other embodiments this process can be automated or partly automated (e.g., with operator supervision) using computer learning subroutines and/or algorithms. Computer learning algorithms can also be used to recognize and flag structures with simple analytic geometries, such as flat planes, regular polygons, and cylindrical elements. Such analytic geometries are often necessary at boundary locations such as bolt holes and mating surfaces between adjacent parts. Accordingly, voxel manipulation in step 106 can include flagging voxels encompassed by such analytic structures to prevent their adjustment by loss through subsequent smoothing processes. A structure intended to include a bolt collar, for example, could be analyzed to recognize and preserve structures resembling analytic cylinders, through subsequent smoothing. Even if some or all corrections made in step 106 are performed by a human operator, method 100 enables some labor savings by allowing these manual edits to be relatively rough, due to subsequent smoothing (Step 108; see below). In some embodiments, voxel manipulation at step 106 can include the addition of sacrificial voxels (by assigning extra voxels to the workpiece) that are removed (i.e. reassigned to the environment) after smoothing, so as to form a sharp-edged final structure.

Voxel-based smoothing is accomplished by applying three-dimensional smoothing filters to each voxel within or surrounding the workpiece (Step 108). Smoothing filters adjust assignment of each voxel based on assignments of adjacent or nearby voxels. Filter operations can include Gaussian filters, mean or median value filters, max or min filters, Lanczos filters, Bilateral filters, anisotropic diffusion filters, curvature anisotropic diffusion filters, gradient anisotropic diffusion, curvature flow filters, min/max curvature flow, non-local means filters, box filters, majority filters, recursive exponential filters, SNN filters, sigma filters, Nagao filters, despeckle filters, and other arithmetic smoothing filters or combinations of filters.

Smoothing can require several successive iterations of filtering. In many embodiments, different three-dimensional smoothing filters can be applied in successive filtering steps. This filtering tends to reduce surface irregularity on the volumetrically-described workpiece, as defined by a resulting finished volumetric data set $V_F$. As noted above, some analytic structures to be preserved or inserted into the volumetric data set (e.g., bolt holes, mating surfaces) can be exempted from smoothing.

Some filters do not preserve volume, allowing total workpiece volume to be lost during the smoothing process. To accommodate such cases, the present method can include a further step of dilating a part to preserve volume. (Step 109). Dilation is accomplished by adding a small number of voxels (e.g., 1 to 3) surrounding the voxelized (volumetric) part model, i.e. by flagging those immediately surrounding voxels as belonging to the workpiece. This addition of volume to the workpiece offsets volume lost to smoothing. Although step 109 is illustrated in FIG. 1 as following smoothing step 108 and preceding step 110, step 109 can in some cases be performed prior to filtering step 108.

After voxel-based smoothing and any necessary dilation to preserve volume are complete, a smooth surface $S_S$ is fitted to finished volumetric data set $V_F$. (Step 110). Smooth surface $S_S$ describes a boundary between the workpiece and its environment, and/or between separate regions of the workpiece. Smooth surface $S_S$ is then exported in a manufacturing design format acceptable as input to additive manufacturing apparatus or other downstream design process. (Step 112). This format can, for example, be a surface computer aided design (CAD) format accepted by manufacturing apparatus or CAD software. In some embodiments, however, this format can be volumetric, and step 110 can accordingly be omitted. Post-processing can be performed on the resulting manufacturing-format design, as needed. (Step 114). In some embodiments, method 100 can enforce symmetry in a designed workpiece by a defining a plane of symmetry, deleting all design located on a first side of the plane, and mirroring the design on the opposite side of the plane across to the first side. (Step 116). Alternatively, symmetry can be enforced via a Boolean union of each side with a reflection of the opposite side. In general, any seams in surface contour resulting from symmetry enforcement can be removed by manual editing, through ordinary filtering, or through the combination of normal filtering (as described above) with additional localized filtering in the vicinity of the plane of symmetry. Although step 116 is shown following design post-processing step 114, some embodiments of the present method can enforce symmetry earlier in the design process, e.g., together with step 106, between steps 104 and 106, or after steps 108 or 110.

Figure 2:
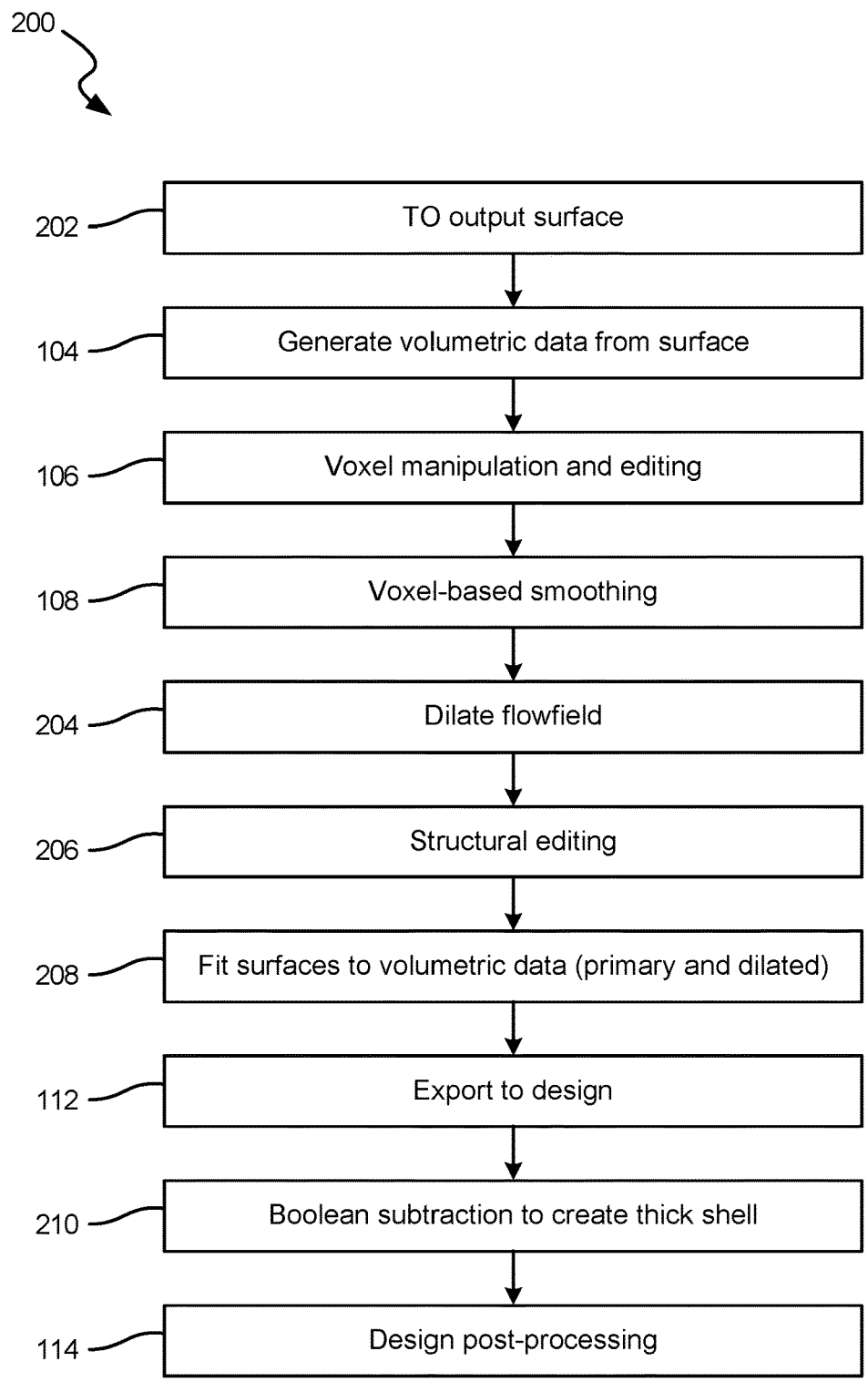
FIG. 2 is a flowchart illustrating an expansion of the method of FIG. 1, for use with flow optimized surfaces.

FIG. 2 is a flowchart of method 200, a design method similar to method 100. Method 200 is used to smooth flow-interacting structures such as ducts or channels. Like method 100, method 200 begins with the generation of an output surface via TO. (Step 202). In method 200, this TO specifically optimizes for flow objectives (e.g., flow speed, pressure drop), and generates a flow surface describing a fluid flow boundary. Steps 104, 106, 108, 112, and 114 are substantially as described above with respect to method 100. Steps 104, 106, and 108 together generate a volumetric flowfield describing the flow volume of the flow-interacting structure. In some embodiments, symmetry can be enforced as discussed above with respect to FIG. 1. After the three-dimensional smoothing filters are applied (step 108), this smoothed flow field is dilated by the addition of extra voxels to the workpiece (i.e. by assignment of extra voxels to the workpiece) in a region immediately surrounding the flow field. (Step 204). This dilation produces a dilated or "thickened" flow field. Dilation can, for example, be accomplished by reassigning environmental voxels to the workpiece if they are sufficiently close to workpiece voxels. This dilated flow field can optionally be dilated differently in different regions of workpiece, or edited after dilation, such that the thickness of the dilation is varied for structural strength or weight savings. (Step 206). Surfaces are then fit to both the dilated and undilated (primary) flow fields, substantially as set forth above with respect to step 110 of method 100. (Step 208). The surface fitted to the dilated flow field corresponds to an outer surface of the resulting duct or passage structure, while the surface fitted to the undilated flow field corresponds to an internal flow-facing surface of the structure. These surfaces are exported to a design format as described above. (Step 212). The resulting workpiece can, for the example of solid modeling, be defined by Boolean subtraction of the solid defined by the inner surface from the solid defined by the outer surface. (Step 210). Alternatively, in the case of surface-based CAD modeling, a CAD model can be constructed in which the inner and outer surface both form exterior walls of the duct or passage structure. Post-processing can be done as in method 100, e.g., to remove sacrificial design material or add preset features such as mating flanges and fastener receivers. (Step 114)

Figure 3:
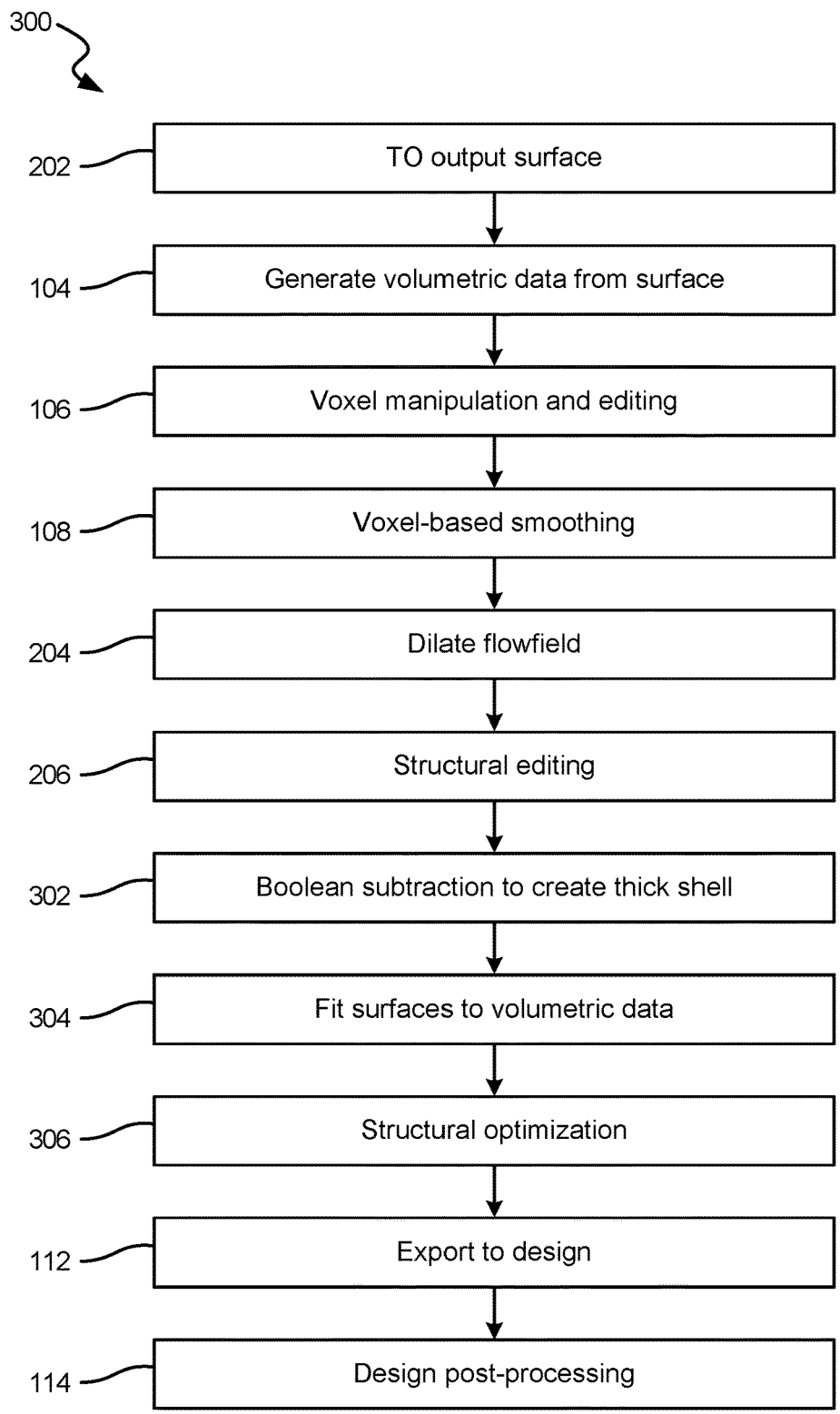
FIG. 3 is a flowchart illustrating an alternative to the method of FIG. 2.

FIG. 3 is a flowchart of method 300, an alternative method to method 200. Like method 200, method 300 is used to smooth flow-interacting structures such as ducts or channels. Method 300 differs from method 200 primarily in that Boolean subtraction of the undilated flowfield from the dilated flowfield is performed in volumetric data, and immediately follows the structural editing of step 206. (Step 302). Rather than generating inner and outer smoothed surfaces from separate sets of finished volumetric data $V_F$ corresponding to the dilated and undilated flowfields as in method 200, subtraction step 302 generates a single volumetric data set $V_F$ of the workpiece as a hollow, smoothed structure from which all smoothed surfaces $S_S$ are generated (Step 304).

In at least some embodiments, subsequent TO of the non-flow-facing portions for structural parameters (e.g., rigidity, strength) can be performed on the resulting hollow structure, while holding the flow-facing surface fixed to preserve desired flow characteristics of the structure as a whole. (Step 306). This optimization process can include a second iteration of smoothing of the non-flow-facing portion, substantially as described above with respect to method 100. Once both (or all) portions of the workpiece have been optimized for appropriate flow and structural parameters and smoothed, the resulting geometry is exported in a CAD or otherwise manufacturing-friendly format (Step 112), and post-processed as necessary (Step 114).

Although the aforementioned method contemplates optimizing portions for flow characteristics and structural characteristics sequentially, any of the above methods can be modified to integrate surfaces generated in parallel via different TO processes to form a single unfinished volumetric data set $V_U$ that is smoothed via three-dimensional filtering, as described above. In general, the present invention encompasses the use of three-dimensional volumetric smoothing filters with a volumetric data set generated from any number of topology-optimized surfaces. These methods reduce or eliminate manual artifact correction necessary to transform surfaces created via TO processes into workable part designs.

DISCUSSION OF POSSIBLE EMBODIMENTS

The following are non-exclusive descriptions of possible embodiments of the present invention.

A method of generating a smooth optimized part design for a workpiece, the method comprising: performing topology optimization based on design objectives and constraints, to generate surface data describing an optimized but unfinished surface; generating volumetric data describing the workpiece structure based on the surface data; applying a three dimensional smoothing filter to the volumetric data; and generating a manufacturing design from the smoothed volumetric data.

The method of the preceding paragraph can optionally include, additionally and/or alternatively, any one or more of the following features, configurations and/or additional components:

A further embodiment of the foregoing method, wherein the surface data is stereolithographic data.

A further embodiment of the foregoing method, wherein the volumetric data comprises a voxel representation of a workpiece structure delineated by the unfinished surface.

A further embodiment of the foregoing method, wherein generating the volumetric data comprises: differentiating interior from exterior volume of the workpiece, as delineated by the unfinished surface; and assigning voxels of the interior volume to the workpiece.

A further embodiment of the foregoing method, wherein the workpiece comprises multiple separate regions, the wherein the method further comprises: differentiating volumes of the separate regions and assigning voxels to those volumes, separately.

A further embodiment of the foregoing method, wherein voxel assignment to each volume can be fractional.

A further embodiment of the foregoing method, wherein the smoothing filter includes at least one filter step from a set consisting of: Gaussian filtering, mean filtering, median filtering, max or min filtering, Lanczos filtering, Bilateral filtering, anisotropic diffusion filtering, curvature anisotropic diffusion filtering, gradient anisotropic diffusion, curvature flow filtering, min/max curvature flow, non-local means filtering, box filtering, majority filtering, recursive exponential filtering, SNN filtering, sigma filtering, Nagao filtering, and despeckle filtering.

A further embodiment of the foregoing method, wherein the smoothing filter includes a plurality of non-identical iterative filtering steps.

A further embodiment of the foregoing method, further comprising editing the volumetric data to add, edit, or remove material by assigning voxels to the workpiece, to a region, or to environment, prior to smoothing.

A further embodiment of the foregoing method, wherein editing the volumetric data comprises assigning voxels to the workpiece so as to fill unwanted voids or cavities.

A further embodiment of the foregoing method, wherein editing the volumetric data comprises assigning voxels to the workpiece so as to add sacrificial voxels, and wherein the method further comprises: assigning the sacrificial voxels to environment after applying the three-dimensional smoothing filter.

A further embodiment of the foregoing method, further comprising defining analytic structures in the volumetric data, wherein applying the smoothing filter does not alter the analytic structures.

A further embodiment of the foregoing method, wherein defining the analytic structures comprises recognizing and flagging structures with simple analytic geometries.

A further embodiment of the foregoing method, wherein generating a manufacturing design from the smoothed volumetric data comprises: fitting a part surface to the smoothed volumetric data; and exporting the part surface in a manufacturing or computer aided design format.

A further embodiment of the foregoing method, wherein the design objectives include flow objectives, and the unfinished surface is a flow surface.

A further embodiment of the foregoing method, further comprising: dilating a flowfield described by the volumetric data; and subtracting the undilated flowfield from the dilated flowfield to form a hollow shell.

A further embodiment of the foregoing method, further comprising adjusting a surface defined by the dilated flowfield through topology optimization based on structural design objectives and constraints.

A further embodiment of the foregoing method, further comprising enforcing symmetry of the volumetric data, before applying the smoothing filter.

A further embodiment of the foregoing method, wherein the surface data describes at least a second optimized but unfinished surface, and wherein each optimized but unfinished surface is generated using different design objectives and constraints.

A further embodiment of the foregoing method, wherein the different design objectives and constraints include both structural and flow objectives and constraints.

SUMMATION

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of generating a smooth optimized part design for a 3D workpiece, the method comprising:
    performing topology optimization based on design objectives and constraints, to generate stereolithographic surface data describing an optimized but unfinished 2D surface of the 3D workpiece, wherein the design objectives include flow parameters and the unfinished 2D surface is a flow surface;
    generating volumetric data describing the workpiece structure based on the surface data, wherein the volumetric data comprises a voxel representation of the workpiece structure delineated by the optimized but unfinished 2D surface;
    dilating a flowfield described by the volumetric data to form a dilated flowfield;
    subtracting the undilated flowfield from the dilated flowfield to form a hollow shell in the volumetric data;
    applying a three dimensional smoothing filter to the volumetric data to produces smoothed volumetric data; and
    generating a manufacturing design from the smoothed volumetric data.

2. The method of claim 1, wherein generating the volumetric data comprises:
    differentiating interior from exterior volume of the workpiece, as delineated by the unfinished surface; and
    assigning voxels of the interior volume to the workpiece.

3. The method of claim 2, wherein the workpiece comprises multiple separate regions, and wherein the method further comprises:
    differentiating volumes of the separate regions and assigning voxels to those volumes, separately.

4. The method of claim 2, wherein the assignment of each voxel to each volume can be fractional.

5. The method of claim 1, wherein the smoothing filter includes at least one filter step from a set consisting of: Gaussian filtering, mean filtering, median filtering, max or min filtering, Lanczos filtering, Bilateral filtering, anisotropic diffusion filtering, curvature anisotropic diffusion filtering, gradient anisotropic diffusion, curvature flow filtering, min/max curvature flow, non-local means filtering, box filtering, majority filtering, recursive exponential filtering, SNN filtering, sigma filtering, Nagao filtering, and despeckle filtering.

6. The method of claim 1, wherein the smoothing filter includes a plurality of non-identical iterative filtering steps.

7. The method of claim 1, further comprising editing the volumetric data to add, edit, or remove material by assigning voxels to at least one of the workpiece or to an environment, prior to smoothing.

8. The method of claim 7, wherein editing the volumetric data comprises assigning voxels to the workpiece, thereby filling unwanted voids or cavities.

9. The method of claim 7, wherein editing the volumetric data comprises assigning voxels to the workpiece, thereby adding sacrificial voxels, and wherein the method further comprises:
    assigning the sacrificial voxels to the environment after applying the three-dimensional smoothing filter.

10. The method of claim 1, further comprising defining analytic structures in the volumetric data, wherein applying the smoothing filter does not alter the analytic structures.

11. The method of claim 10, wherein defining the analytic structures comprises recognizing and flagging structures with simple analytic geometries.

12. The method of claim 1, wherein generating a manufacturing design from the smoothed volumetric data comprises:
    fitting a part surface to the smoothed volumetric data; and
    exporting the part surface in a manufacturing or computer aided design format.

13. The method of claim 1, further comprising adjusting a surface defined by the dilated flowfield through topology optimization based on structural design objectives and constraints.

14. The method of claim 1, further comprising enforcing symmetry of the volumetric data, before applying the smoothing filter.

15. The method of claim 1, wherein the surface data describes at least a second optimized but unfinished surface, and wherein each optimized but unfinished surface is generated using different design objectives and constraints.

16. The method of claim 15, wherein the different design objectives and constraints include both structural and flow objectives and constraints.

* * * * *